(No Model.)
G. WELLHOUSE.
Blower for Open Stoves.
No. 241,574.  Patented May 17, 1881.
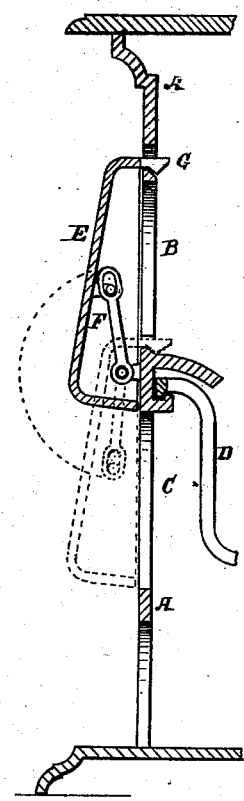
Witnesses:
E. M. Stuart
John Memmer
Inventor:
George Wellhouse,
by C. S. Humphrey
Atty.

UNITED STATES PATENT OFFICE.

GEORGE WELLHOUSE, OF AKRON, OHIO.

BLOWER FOR OPEN STOVES.

SPECIFICATION forming part of Letters Patent No. 241,574, dated May 17, 1881.

Application filed January 24, 1881. (No model.)

*To all whom it may concern:*

Be it known that I, GEORGE WELLHOUSE, of Akron, in the county of Summit and State of Ohio, have invented a new and useful Improvement in Blowers for Open Stoves and Grates, of which the following is a specification.

My invention has relation to that class of blowers which are connected to the stove or grate front by vertically-swinging arms or links, and are adapted to close either the space above or the space in front of the fire-basket, described in Letters Patent of the United States No. 236,199, granted to me January 4, 1881.

In some instances it is found difficult from the shape of the stove or grate front to adapt the blower to be held in position by gravitation alone, and for other reasons it is often desirable to fasten the blower more securely in position.

To overcome the former difficulty and provide the required fastening is the object of my invention; and it consists in constructing upon the blower of the kind hereinbefore referred to a hook or latch adapted to engage a corresponding catch upon the stove-front, or vice versa; and it further consists in constructing the joint between the link and blower or link and stove-front with an elongated hole or slot to permit the blower to be raised and lowered sufficiently to engage and disengage the hook or latch and catch.

The accompanying drawing represents a vertical central section of a stove-front and blower embodying my invention, in which A is the stove-front, with the openings above and in front of the fire-basket D, represented by B and C respectively.

The blower E is connected to the front A, as in the patent hereinbefore referred to, by the hinged arm F, and upon its upper edge carries the hook G, which engages a corresponding hole or catch in the front A. To enable the blower to raise sufficiently for the hook G to enter the catch, the upper end of the link is slotted.

It is obvious that the slot may be in either end of the link, or the pin may be in the link and the slot in either bearing.

The hook, as before suggested, may be attached to either stove-front or blower, or another style of fastening may be adopted without departing from my invention, which is—

1. A blower for an open stove or grate adapted to close either the space above or the space in front of the fire-basket, provided with a catch, substantially such as is shown, to hold it in either position, and connected to the stove or grate front by vertically-swinging arms, hinged both to the blower and the stove-front, substantially as shown, for the purpose specified.

2. A blower for an open stove or grate connected with the stove or grate front by a vertically-swinging arm or arms, and arranged by devices, substantially such as are shown, to be moved independently in the line of the arm or arms, substantially as shown, for the purpose specified.

In testimony that I claim the foregoing I have hereunto set my hand this 21st day of January, A. D. 1881.

GEORGE WELLHOUSE.

Witnesses:
C. P. HUMPHREY,
E. W. STUART.